(12) United States Patent
Laine

(10) Patent No.: US 6,252,690 B1
(45) Date of Patent: Jun. 26, 2001

(54) SATELLITE ONBOARD DATA TRANSMISSION SYSTEM

(75) Inventor: Robert Laine, Plaisance du Touch (FR)

(73) Assignee: Alcatel Espace, Courbevoie (FR)

( * ) Notice: Subject to any disclaimer, the term of this patent is extended or adjusted under 35 U.S.C. 154(b) by 0 days.

(21) Appl. No.: 08/554,460

(22) Filed: Nov. 7, 1995

Related U.S. Application Data

(63) Continuation of application No. 08/132,868, filed on Oct. 7, 1993, now abandoned.

(30) Foreign Application Priority Data

Oct. 8, 1992 (FR) .................................................. 92 11961

(51) Int. Cl.⁷ .................................................. H04B 10/10
(52) U.S. Cl. .................................................. 359/172; 359/163
(58) Field of Search .................................... 359/172, 152, 359/154, 157, 163

(56) References Cited

U.S. PATENT DOCUMENTS

| | | | |
|---|---|---|---|
| 4,063,083 | * 12/1977 | Cathey et al. | 359/152 |
| 4,596,050 | * 6/1986 | Rogers | 359/163 |
| 4,717,913 | * 1/1988 | Elger | 359/172 |
| 4,867,560 | * 9/1989 | Kunitsugu | 359/172 |
| 4,975,926 | * 12/1990 | Knapp | 359/172 |
| 5,023,865 | * 6/1991 | Grant et al. | 370/3 |
| 5,119,225 | * 6/1992 | Grant et al. | 359/172 |
| 5,218,467 | * 6/1993 | Ross et al. | 359/172 |
| 5,305,132 | * 4/1994 | Fasen et al. | 359/172 |
| 5,335,361 | * 8/1994 | Ghaem | 359/152 |

FOREIGN PATENT DOCUMENTS

| | | | |
|---|---|---|---|
| 2141258 | * 4/1983 | (GB) | 359/152 |
| 0307040 | * 5/1989 | (GB) | 359/172 |
| 0165232 | * 6/1989 | (JP) | 359/172 |
| 401261934 | * 10/1989 | (JP) . | |
| 3274839 | * 9/1990 | (JP) | 359/152 |
| 2015157 | * 9/1992 | (WO) | 359/172 |

OTHER PUBLICATIONS

IEEE Transactions on Aerospace and Electronic Systems, vol. 27, No. 3, May 1991, New York, US, pp. 507–513, Wakatsuki et al: "Compact equipment for on–board communications, subsystem supervisory and control".

Optics and Laser Technology, vol. 14, No. 2, Apr. 1982, Haywards Heath, Great Britain, pp. 93–97, Taylor et al: "Fibre optics systems for space applications".

Nakata et–al, In—House Wireless Communication System Using Infrared Radiation, 1985, all.*

Gfeller, Infrared Communication for In–House Applications, 1978 IEEE.*

Y.S. Lee, Technology Assessement for Implementation of Optical Intersatellite Link, 1981, pertinent Pages—all.*

* cited by examiner

*Primary Examiner*—Leslie Pascal
(74) *Attorney, Agent, or Firm*—Sughrue, Mion, Zinn, Macpeak & Seas, PLLC

(57) ABSTRACT

A system for transmitting data inside a satellite comprises senders and receivers of digital signals containing the data interconnected by non-directional infra-red links.

16 Claims, 3 Drawing Sheets

SATELLITE ONBOARD DATA TRANSMISSION SYSTEM

BACKGROUND OF THE INVENTION

This is a continuation of Application No. 08/132,868, filed Oct. 7, 1993 now abandoned.

FIELD OF THE INVENTION

The present invention concerns a satellite onboard data transmission system. More specifically, it concerns a system for sending and receiving digital telecontrol (TC) and telemetry (TM) signals inside a satellite.

DESCRIPTION OF THE PRIOR ART

A satellite carries many items of electronic equipment such as amplifiers, receivers, filters, etc. This equipment is often redundant for reasons of reliability and is part of a satellite television or telephone transmission system, for example, or systems providing satellite onboard service functions (management, control, power supply, etc).

When the satellite is launched a nominal operating configuration is chosen, i.e. a number of equipment units are selected to implement the service functions, a number of channels are selected for telephone signal transmission and a number of channels are selected for television signal transmission. This configuration may be modified during the lifetime of the satellite, for commercial reasons in particular. To reconfigure the equipment as required, the ground control and monitoring stations transmit telecontrol signals by radio to a receiver on the satellite which forwards them to a digital central unit CU comprising a CTU (Control Terminal Unit) for processing these signals and a plurality of RTU (Remote Terminal Units) which transmit these signals to the various equipment units. The TC signals can also be used to select which of the redundant equipment units are activated, especially the units of the systems which implement the satellite onboard service functions. The TC signals manage the operation of all the satellite onboard electronic equipment.

It is always desirable to carry out tests to verify that the TC signals have been executed correctly or to detect from the ground any faults which may compromise the correct operation of the satellite or disturb the signals transmitted. The various equipment units send telemetry signals for this purpose to the CU which transmits them to the ground stations using appropriate satellite onboard transmitters connected to the CU. The TM signals are sent either in response to TC signals or systematically so that the status of the satellite onboard equipment is monitored systematically.

TM and TC signals are conveyed between the CU and the various equipment units by conventional wired links in the form of cables; the set of wired links for telecontrol and telemetry signals is known as the TM-TC harness.

A constant preoccupation of satellite designers is minimizing the onboard mass in order to reduce the launch cost and the overhead in terms of the fuel required to keep the satellite in orbit (or to increase the orbital life of a satellite for the same quantity of fuel).

The TM-TC harness has a relatively high mass, in the order of several tens of kilograms. There are many wired connections because each connection between the equipment unit concerned and the CU has to be bidirectional to separate the TM and TC signals and the signals concerning each equipment unit.

The patent application JP-1 261 934 discloses a satellite onboard system for transmission of control and measurement signals.

These signals are conveyed between a control unit and equipment units by means of laser beams emitted by semiconductor laser senders and received by appropriate sensors. A system of this kind can reduce the mass of the TM-TC harness.

This system is not satisfactory, however.

The laser technology requires the use of highly directional beams. The number of beams required is equal to the number of unidirectional links between the control unit and the equipment unit (in practise there is a bidirectional connection for each equipment unit) which means that the satellite must be equipped with the same number of laser senders/receivers as the number of unidirectional links, which makes the system costly and less than optimal from the point of view of its mass.

Further, the use of directional laser beams requires precise adjustment of the senders/receivers which adds further to the complexity of the system, in particular at assembly time.

An object of the present invention is to provide a satellite onboard system for transmission of data of lower mass than data transmission systems currently employed.

SUMMARY OF THE INVENTION

The present invention consists in a system for transmitting data inside a satellite, and comprising senders and receivers, of digital signals containing said data, interconnected by non-directional infra-red links.

Because the infra-red links are non-directional the same sender and the same receiver in the CU can be used for more than one equipment unit. This avoids a large number of senders/receivers at the CU with the result that the mass of the satellite and the cost of the system can be reduced.

The invention also makes it possible to simplify system management; instead of sending a specific telecontrol signal to each equipment unit, as in a system using laser beams, a single signal can be sent to several equipment units each of which then uses any method to select the part of the common signal addressed to it. The system in accordance with the invention therefore also makes it possible to simplify the transmission process.

Also, non-directional infra-red senders and receivers are much simpler to adjust than directional laser senders.

Every sender inside the satellite is advantageously capable of communicating with at least one receiver inside the satellite by means of direct infra-red links or by multiple reflections.

To this end optical mirrors may be disposed inside the satellite if its internal surfaces are insufficiently reflective of themselves.

The digital signals may comprise both telecontrol signals sent by a central unit inside the satellite to equipment units inside the satellite and telemetry signals sent by the equipment units to the central unit. The system in accordance with the invention can then be used for control and monitoring of the satellite onboard equipment units from the ground. The infra-red links employed are therefore bidirectional links. The digital signals may instead comprise only telecontrol signals or only telemetry signals if one or other of the above two functions is not required.

Each telecontrol signal advantageously has an addressing header such that only the equipment unit to which it is addressed can respond to the telecontrol signal.

This enables each equipment unit receiving the signal sent by a single sender to determine which part of the signal is addressed to it. This simplifies management of transmission at the central unit.

The senders and the receivers may be infra-red diodes.

Other features and advantages of the present invention will emerge from the following description given by way of non-limiting illustrative example only.

DETAILED DESCRIPTION OF THE INVENTION

Items common to more than one figure are identified by the same reference symbols.

Figure 1:
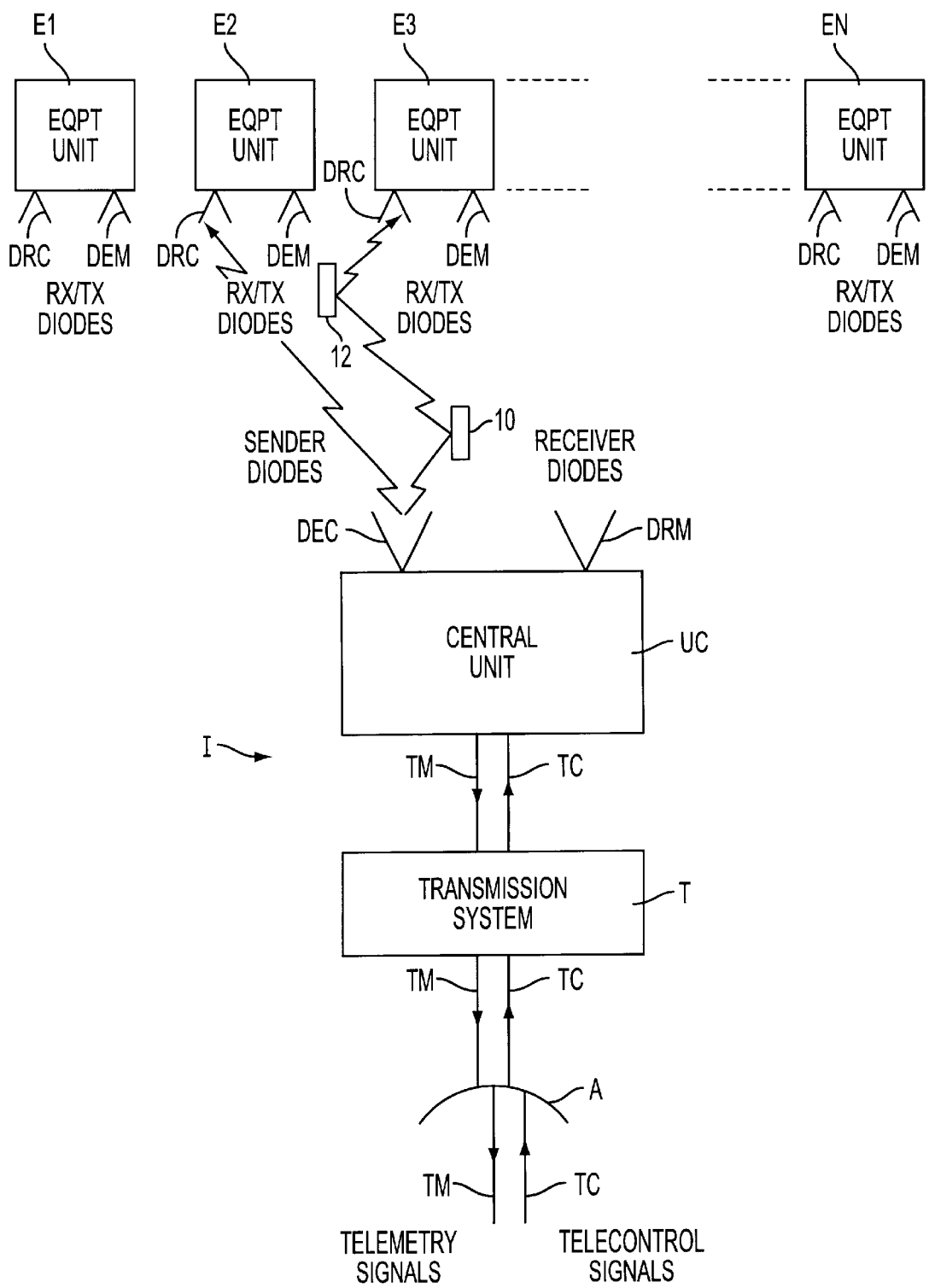
FIG. 1 is a block schematic of a data transmission system in accordance with the invention.

A system I in accordance with the invention shown in FIG. 1 can be used to transmit telecontrol signals TC to equipment units E1, E2, . . . , EN and to receive telemetry signals TM sent by the latter. The equipment units E1 through EN are all disposed on the inside walls of a satellite (not shown) to allow heat to flow to the exterior of the satellite.

The system I comprises a central unit CU comprising one CTU and one RTU and providing the interface between the equipment units E1 through EN and transmitters and receivers (not shown) providing communication with ground stations and forming part of a satellite onboard transmission system T.

The ground stations transmit telecontrol signals TC by radio. These signals are received by one or more antennas A on the satellite and forwarded to the receivers of the system T which passes them to the central unit.

The function of the central unit is to digitize the telecontrol signals TC (if they are not digitized already), to encode them and to convert them into optical signals to be broadcast to the equipment units E1 through EN by means of one or more infra-red sender diodes DEC the number of which is less than the number of equipment units E1 through EN and which are preferably situated on the outside walls of the central unit so as to minimize the wiring required between them and the central unit.

The diodes DEC are arranged in such a way that the equipment units E1 through EN, each of which is provided with an infra-red signal receiver diode DRC for this purpose, can receive the signals TC transmitted. Like the diodes DEC, the diodes DRC are on the outside walls of the associated equipment units to minimize the wiring required.

Figure 4:
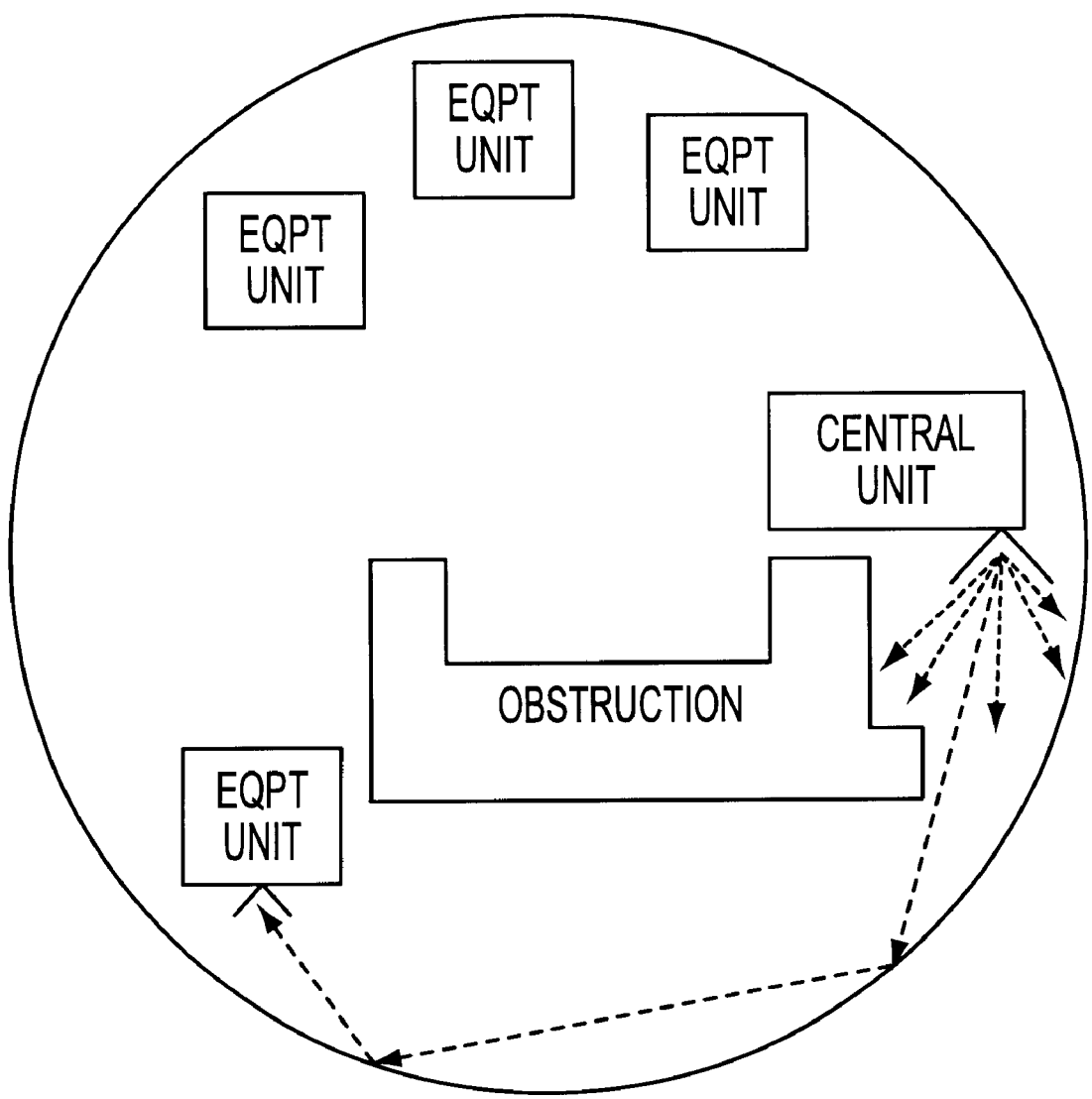
FIG. 4 is a schematic showing a non-directional transmission from a sender diode of a central unit to a receiver diode of an equipment unit using successive reflections from inside walls of a satellite.

The diodes DRC of most equipment units are in the direct line of sight of the diode(s) DEC and therefore receive the TC signals directly. However, some equipment units are hidden by others or are out of the direct line of sight of the beams emitted by the diodes DEC; they then receive the TC signals as the result of successive reflections from the inside walls of the satellite (se FIG. 4) or, if the latter are insufficiently reflective, from optical mirrors (10/12) appropriately disposed inside the satellite.

Figure 2:
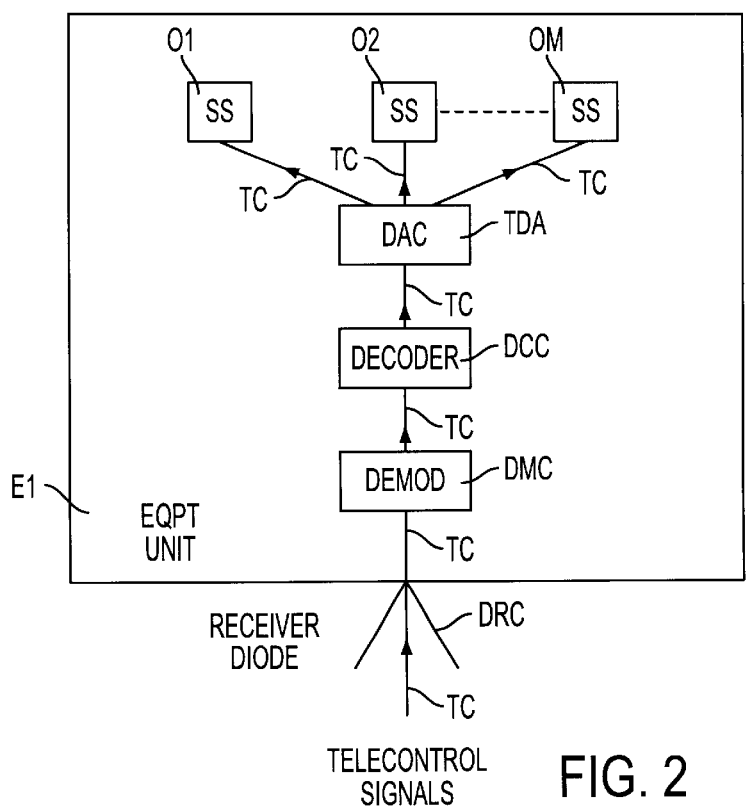
FIG. 2 is a detailed block schematic of the telecontrol function within an equipment unit.

The optical signals TC are then converted into electrical signals by a demodulator DMC (FIG. 2) and then decoded by means of a decoder DCC and if necessary converted into analog signals by a digital-analog converter TDA in order to be executed by the subsystems 01, 02, . . . , OM concerned of the equipment units to which they are addressed.

The infra-red sender diodes are advantageously chosen to emit wide and therefore only slightly directional beams. Thus several diodes DRC are usually illuminated by the same beam. The TC signals formatted by the central unit therefore include an addressing header for each equipment unit which can be decoded by all the equipment units but understood by only the equipment unit to which it is addressed, which then decodes the respective message.

Where telemetry is concerned, each equipment unit has an infra-red signal sender diode DEM on its outside walls in order to reduce the wiring needed.

Figure 3:
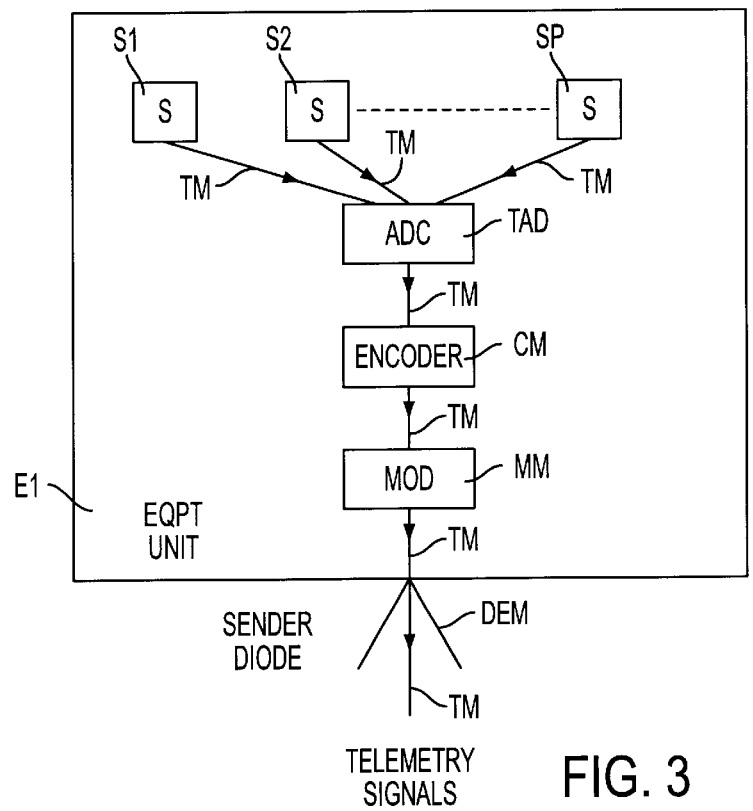
FIG. 3 is a detailed block schematic of the telemetry function within an equipment unit.

The analog telemetry signals collected in each equipment unit by sensors S1, S2, . . . , SP (FIG. 3) are converted within the equipment units into digital signals using an analog-digital converter TAD, encoded by an encoder CM and converted into optical signals by an electro-optical modulator MM. If the telemetry signals are digital from the outset they are obviously sent directly to the encoder CM.

The diodes DEM send the TM signals to one or more infra-red receiver diodes DRM the number of which is less than the number of equipment units E1 through EN and which are preferably arranged on the outside walls of the central unit. As with the TC signals, these signals may be received by the central unit either directly or after successive reflections either from the inside walls of the satellite or from optical mirrors at appropriate locations inside the satellite.

The central unit formats and packages the TM signals it receives and passes them to the system T which transmits them by radio to the control and monitoring stations on the ground.

Infra-red transmission makes it possible not only to reduce the weight of the TM-TC harness but also to use reflection of the transmitted signals either by optical mirrors at specific locations on the satellite or by reflective surfaces inside the satellite.

The earth return of the power supply network inside the satellite may be made either directly through the structure of the satellite if the latter is conductive or by means of a common ground conductor.

Various telemetry methods may be used. In a first method the telemetry signals are sent sequentially by the equipment units, the equipment units send a TM signal turn and turn about and there is no possibility of confusion when these signals are received by the central unit.

In a second method which further simplifies system management by using non-directional or only slightly directional infra-red links all the equipment units send TM signals simultaneously. In this case the TM signals are such that they cannot combine to produce a signal that is meaningful to the central unit: these TM signals are said to be encoded orthogonally.

The invention has many advantages.

Firstly, it enables the mass of the satellite to be reduced and consequential and very significant savings in launch cost and satellite stationkeeping costs or a substantial increase in the operational life of the satellite.

Also, it simplifies management of the TM and TC signals.

Furthermore, the validation tests required before the satellite is launched to qualify the onboard equipments can be carried out much more simply than in the past by using non-directional infra-red control of the equipment units directly from the test bench. The sender(s) carried by the central unit may be placed on the test bench and oriented without precise adjustment towards the equipment units prior to integration. This is not possible with a system using directional laser beams.

The infra-red telecontrol and telemetry signal transmission system in accordance with the invention meets the requirements of telecontrol and telemetry systems:

its error rate is as low as that of conventional systems using wired links because errors are detected and corrected by virtue of a special channel code and the coding of the signals can be the same as in the prior art, there is no common failure mode (propagation of a failure from one system element to another) as there are no physical links between the central unit and the equipment units, and it provides for bidirectional transmission (central unit→equipment units, equipment units→central unit).

Problems such as saturation of the infra-red senders and receivers by light from the sun entering the satellite are avoided by using appropriate filters.

The signal propagation times within the satellite are all in the same order of magnitude; whatever path is taken by a signal between the sender and the receiver its frequency remains the same. This is because the satellite is relatively small.

Infra-red senders and receivers must be selected which are not sensitive to ionizing radiation encountered in space. Such interference could obscure their window or damage them.

The invention is obviously not limited to the embodiment that has just been described.

The expression "non-directional infra-red link" means a link that is not or only slightly directional.

The invention is not limited to the telecontrol and telemetry system specifically described and may be adapted to any satellite onboard data transmission system, the data having any purpose and being of any form.

As many redundant components as may be necessary to guarantee the reliability of the system may be used.

The infra-red diodes may be replaced by other optical components capable of implementing the same non-directional send and receive functions.

Any means may be replaced by equivalent means without departing from the scope of the invention.

There is claimed:

1. A satellite, comprising:
   a system for transmitting data inside said satellite;
   wherein said system comprises, entirely inside said satellite:
      senders,
      receivers, and
      non-directional infra-red links;
   wherein said senders and said receivers respectively send and receive digital signals containing said data,
   wherein said senders are interconnected with said receivers by said non-directional infra-red links, and
   wherein said digital signals are communicated over said non-directional infra-red links.

2. The satellite according to claim 1, wherein:
   each of said senders communicates with one of said receivers by at least one of (1) line-of-sight transmission and (2) reflected transmission.

3. The satellite according to claim 2, wherein:
   said reflected transmission is reflected by an optical mirror disposed inside said satellite.

4. The satellite according to claim 1, wherein:
   said satellite further comprises:
      a central unit, and
      equipment units;
   said central unit and said equipment units are disposed inside said satellite; and
   said digital signals comprise at least one of (1) telecontrol signals sent by said central unit to one of said equipment units and (2) telemetry signals sent by one of said equipment units to said central unit.

5. The satellite according to claim 4, wherein:
   each one of said telecontrol signals includes an addressing headers;
   said addressing header identifies a corresponding one of said equipment units; and
   only said corresponding one of said equipment units is responsive to said one of said telecontrol signals.

6. The satellite according to claim 1, wherein:
   said senders and said receivers comprise infra-red diodes.

7. A satellite, comprising:
   a central unit,
   equipment units, and
   a system for transmitting data between said central unit and said equipment units;
   wherein said system for transmitting data comprises:
      senders,
      receivers, and
      non-directional infra-red links for carrying said data between said senders and said receivers;
   wherein each of said equipment units has a respective sender and a respective receiver, defining respective sender/receiver pairs of said equipment units;
   wherein said central unit has fewer of said senders and fewer of said receivers than the total number of said sender/receiver pairs; and
   wherein each of said senders communicates with one of said receivers by at least one of (1) line-of-sight transmission, (2) transmission reflected by an optical mirror, and (3) transmission by successive reflections from inside walls of said satellite.

8. The satellite as set forth in claim 7, wherein said data comprises at least one of (1) telecontrol signals sent by said central unit to one of said equipment units and (2) telemetry signals sent by one of said equipment units to said central unit.

9. The satellite as set forth in claim 8, wherein:
   each one of said telecontrol signals includes an addressing header;
   said addressing header identifies a corresponding one of said equipment units; and
   only said corresponding one of said equipment units is responsive to said one of said telecontrol signals.

10. A satellite, comprising:
    a satellite onboard transmission system for communicating with a ground station,
    equipment units,
    a central unit for providing an interface between said equipment units and said satellite onboard transmission system, and
    a system for transmitting data between said central unit and said equipment units;

wherein said system for transmitting data comprises:
  senders,
  receivers, and
  non-directional infra-red links for carrying said data between said senders and receivers;
wherein each of said equipment units has a respective sender and a respective receiver, defining respective sender/receiver pairs of said equipment units;
wherein said central unit has fewer of said senders and fewer of said receivers than the total number of said sender/receiver pairs; and
wherein each of said equipment units communicates with said central unit free of intervention by others of said equipment units.

11. The satellite as set forth in claim 10, wherein said data comprises at least one of (1) telecontrol signals sent by said central unit to one of said equipment units and (2) telemetry signals sent by one of said equipment units to said central unit.

12. The satellite as set forth in claim 11, wherein:
each one of said telecontrol signals includes an addressing header;
said addressing header identifies a corresponding one of said equipment units; and
only said corresponding one of said equipment units is responsive to said one of said telecontrol signals.

13. A satellite, comprising:
inner walls,
a central unit, and
equipment units;
wherein said central unit communicates data with said equipment units via non-directional infra-red transmission; and
wherein said transmission overcomes an intervening obstacle by successive reflection from said inner walls.

14. The satellite as set forth in claim 13, wherein said data comprises at least one of (1) telecontrol signals sent by said central unit to one of said equipment units and (2) telemetry signals sent by one of said equipment units to said central unit.

15. The satellite as set forth in claim 14, wherein:
each one of said telecontrol signals includes an addressing header;
said addressing header identifies a corresponding one of said equipment units; and
only said corresponding one of said equipment units is responsive to said one of said telecontrol signals.

16. The satellite as set forth in claim 15, wherein:
said transmission overcomes another intervening obstacle by reflection by an optical mirror.

* * * * *